United States Patent
Kruys

(10) Patent No.: US 7,526,255 B2
(45) Date of Patent: Apr. 28, 2009

(54) METHOD AND SYSTEM FOR COORDINATING RADIO RESOURCES IN UNLICENSED FREQUENCY BANDS

(75) Inventor: Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 11/099,971

(22) Filed: Apr. 5, 2005

(65) Prior Publication Data

US 2006/0223448 A1    Oct. 5, 2006

(51) Int. Cl.
*H04B 1/00* (2006.01)
*H04B 7/00* (2006.01)

(52) U.S. Cl. ............... 455/69; 455/522; 455/454; 455/126; 370/342; 370/347; 370/442

(58) Field of Classification Search .............. 455/69, 455/450, 454, 522, 70, 73, 78, 126; 370/347, 370/442, 342
See application file for complete search history.

(56) References Cited

U.S. PATENT DOCUMENTS 5,907,812 A    5/1999  Van De Berg
6,167,079 A *  12/2000  Kinnunen et al. ........... 375/225
6,463,264 B1 * 10/2002  Obara ...................... 455/127.2
6,853,675 B1 *  2/2005  Oleynik ....................... 375/130
2006/0148482 A1 * 7/2006  Mangold ..................... 455/450

OTHER PUBLICATIONS

Stefan Mangold, et al., "Coexistence of Wireless Networks in Unlicensed Frequency Bands", WWRF#9, Briarcliff Manor, NY, 6 pages, Jul. 2003.
Pierre De Vries, et al., "Spectrum Sharing Rules for New Unlicensed Bands", Microsoft Corporation, 4 pages, Dec. 11, 2003.

* cited by examiner

*Primary Examiner*—Tuan A Pham
(74) *Attorney, Agent, or Firm*—Trellis IP Law Group, PC

(57) ABSTRACT

A method and system is provided for coordinating radio resources in shared or unlicensed frequency bands. Specifically, a set of operating parameters and a receiver-transmitter feedback mechanism are provided that govern the coordination of radio spectrum usage by a plurality of wireless devices. This is achieved by rewarding good receivers and transmitter behavior and/or restricting radio spectrum occupation time. The set of operating parameters include the transmission power, spectrum access probability, spectrum occupation time, and a Receiver Success Rate (RSR).

20 Claims, 4 Drawing Sheets

METHOD AND SYSTEM FOR COORDINATING RADIO RESOURCES IN UNLICENSED FREQUENCY BANDS

BACKGROUND OF THE INVENTION

1. Field of Invention

The embodiments of the invention relate in general to wireless communications, and more specifically to coordinating the use of radio resources by means of a set of operating parameters for efficient spectrum sharing between diverse wireless devices in unlicensed frequency bands.

2. Description of the Background Art

Radio frequency bands (i.e., spectrum) are both scarce and valuable, and therefore, efficient utilization of radio frequencies is essential. The usage of radio spectrum and regulation of radio emissions are coordinated by national regulatory bodies. These regulatory bodies attempt to coordinate the usage of radio frequency (RF) resources to achieve their most efficient usage and to avoid radio spectrum users causing interference towards each other.

The radio spectrum has been divided into two types of frequency bands—licensed and unlicensed. Licensed frequency bands are licensed out by the regulatory bodies to communication service providers and other users, for their exclusive usage. Further, a portion of the spectrum is reserved for defense and emergency applications. The small remaining part of the spectrum constitutes the unlicensed frequency bands.

Unlicensed frequency bands are a part of the radio spectrum, in which any type of radio service is permitted. For this reason, unlicensed frequency bands are also called spectrum commons. In contrast to a licensed approach, a diverse set of radio systems may operate on an unlicensed frequency band, using the same radio resources. As a result, available radio resources are used more frequently and at more places. This, in turn, leads to an increasing need to allocate a new unlicensed spectrum, and/or to provide the means to improve the utility of future unlicensed allocations. This requires spectrum-sharing between diverse radio systems with minimum interference.

There are two dimensions to spectrum sharing: vertical and horizontal sharing. Vertical sharing is between systems with different levels of regulating status, e.g., primary and secondary radio systems. Horizontal sharing is between systems with equal regulating status, e.g., between licensed users or between various types of unlicensed devices. Horizontal sharing can be further distinguished as single-species and multi-species sharing. Single-species sharing is the spectrum sharing between systems that are implemented, using the same technology or technology family. Multi-species sharing is spectrum sharing between technically different systems. Sophisticated and efficient solutions exist for single-species sharing. Exemplary solutions include standards such as Institute of Electrical and Electronics Engineers (IEEE) 802.11. However, the broader problem of a multi-species sharing is more complex, since the co-existing radio systems are assumed to be diverse. Therefore, exact behavior, such as based on IEEE 802.11, cannot be specified without restricting innovation.

A number of known spectrum-sharing techniques exist in current communication systems. However, all known spectrum-sharing techniques are very complex and impose constraints on the type of systems that can co-exist in the unlicensed spectrum. Further, regulations that are overly complex are difficult to understand and enforce. They also impose restrictions on new emerging technologies. Moreover, these techniques work by regulating specific parameters and therefore, they are not technology neutral and may exhibit reduced applicability and scalability.

DETAILED DESCRIPTION OF EMBODIMENTS OF THE INVENTION

Various embodiments of the invention provide a method and system that coordinate radio resource usage by a plurality of wireless devices in an unlicensed frequency band. This involves enabling efficient use of the radio spectrum by means of a set of commonly applied rules and parameters. Since there are no numerical limitations on wireless devices that operate in the frequency band, the method has to be simple and applicable to both small and large numbers of devices. Further, the embodiments of the invention are applicable to a diverse range of technically different wireless devices.

The embodiments of the invention minimize the number of parameters that are subject to the proposed rules. The parameter values are short-term averages such as the transmission power output (T), the transmitter duty cycle (DC), the Listen Before Talk (LBT) threshold, the LBT backoff and the receiver success rate (RSR). The rules are based on rewarding efficient spectrum use. This is achieved not only by means of good receiver design and/or short spectrum occupation, low transmission power, etc. Better receivers result in advantageous channel access. Therefore, the reward is improved opportunity at spectrum access and higher power output criteria. Similarly, shorter duty cycles facilitate access to the radio spectrum (RF) and/or higher RF power. The rules ensure that no device can monopolize the use of the radio spectrum.

Figure 1:
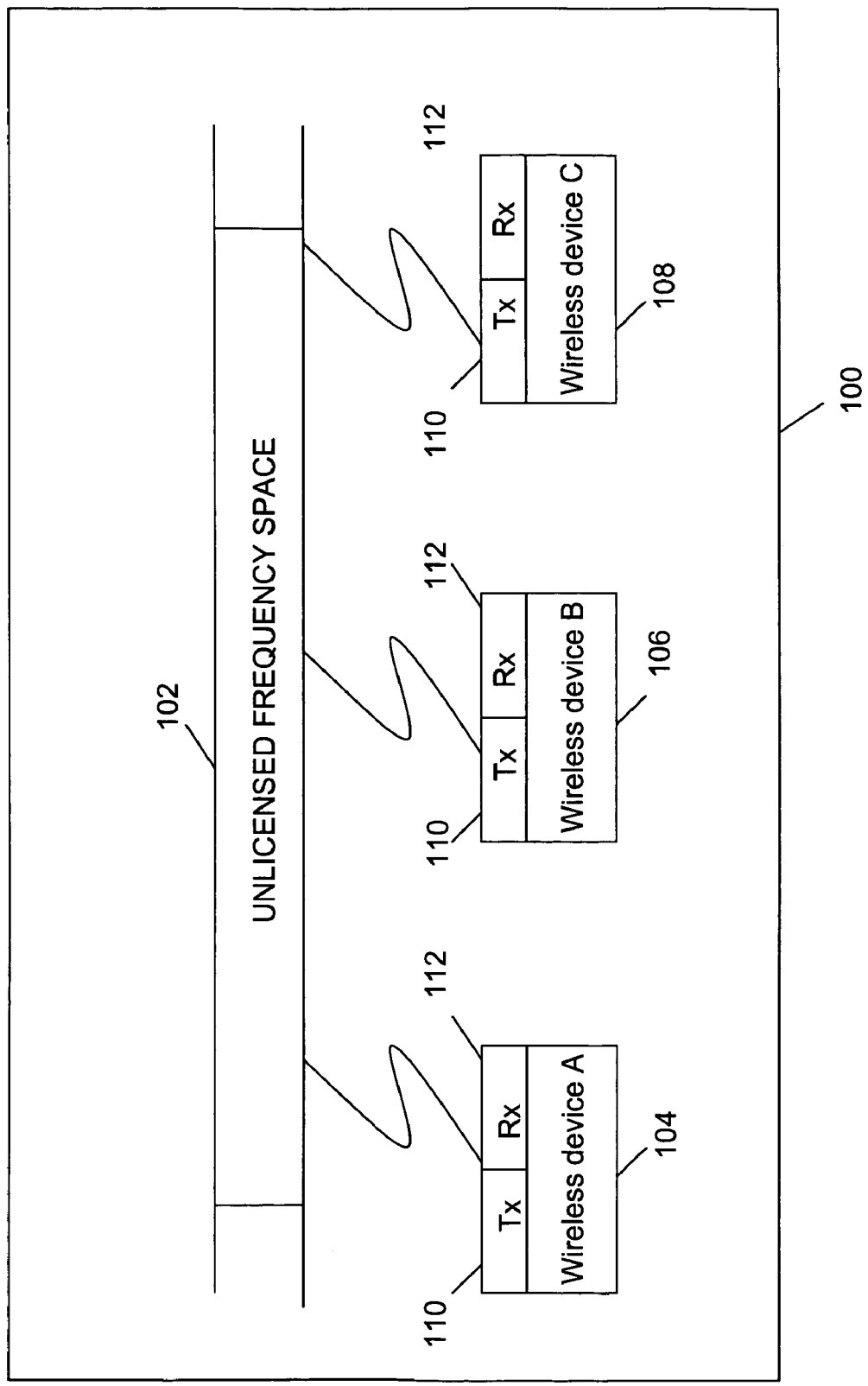
FIG. 1 illustrates a basic network, suitable for use in an exemplary embodiment of the present invention.

FIG. 1 illustrates a basic wireless communication network 100 in an unlicensed frequency band 102. The unlicensed frequency band covers bands such as Industrial, Scientific and Medical (ISM) bands and Unlicensed National Information Infrastructure (U-NII) bands (in the US). An exemplary ISM band can be the 2.4 GHz band and an exemplary U-NII band can be the 5 GHz band.

Communication network 100 includes a plurality of wireless devices, for example, wireless devices 104, 106, and 108. Wireless devices exchange information, using a transmitter 110 and a receiver 112. The information can be, for example, data, voice and video. Wireless devices 104, 106 and 108 may be using a different signaling rate, modulation schemes, and/or need to cover different distances, etc. Examples of wireless devices include mobile phones, Wi-Fi™ devices, Bluetooth devices, ISM cordless phones, and so forth.

Communication between these wireless devices may be affected by interference caused by the diverse technologies being used. As a result, spectrum-sharing rules that reduce interference improve the quality of the communications between said devices implementing spectrum-sharing rules, can be cumbersome or inefficient because of lack of information at any point in time about the behavior of other wireless devices. Since the wireless devices being used are based on diverse technologies, it is difficult to model the exact behavior of their communications. Further, the properties of the communication medium, as seen by a wireless device, are not reliable and they change rapidly. Consequently, a deterministic approach cannot be used to ensure optimal spectrum sharing between the wireless devices.

Figure 2:
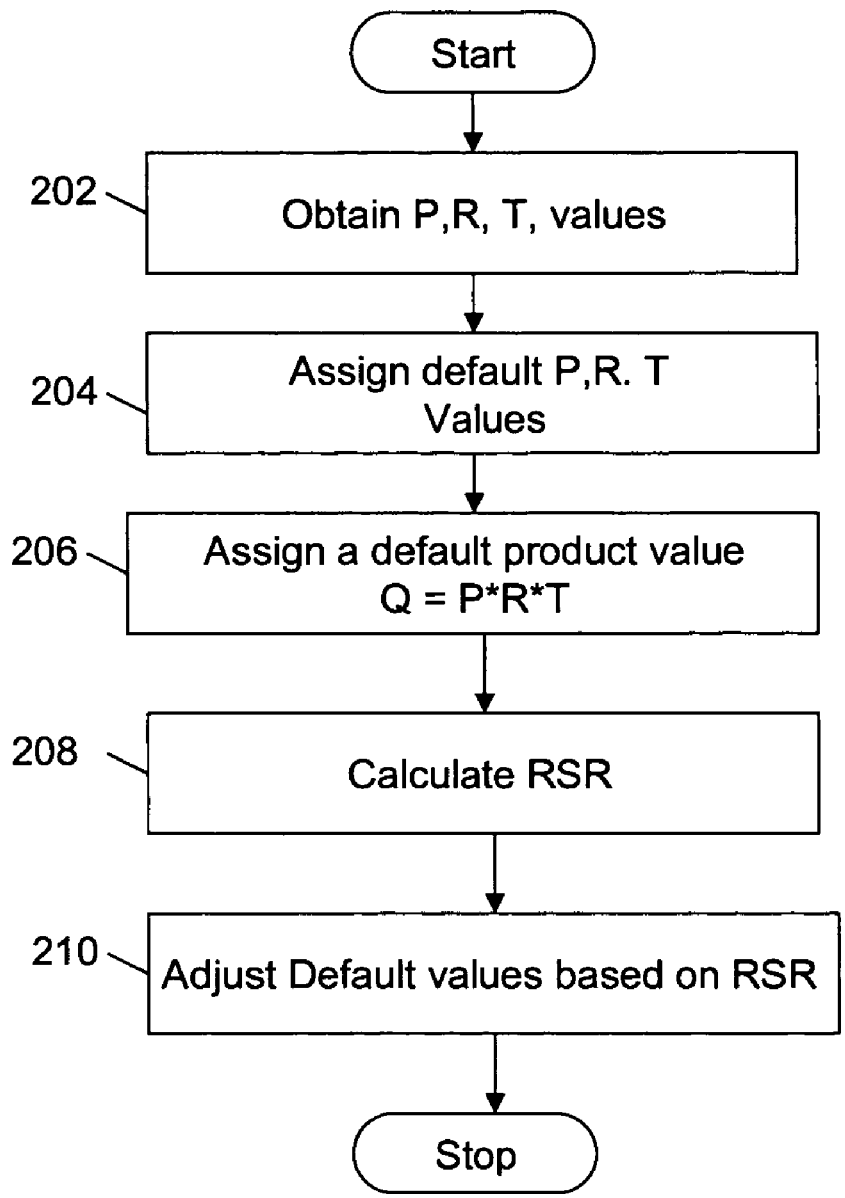
FIG. 2 shows a flowchart depicting a method for coordinating radio resource usage by a plurality of wireless devices in an unlicensed frequency band, in an exemplary embodiment of the invention.

FIG. 2 shows a flowchart depicting a method for coordinating radio resource usage by a plurality of wireless devices in an unlicensed frequency band, in an exemplary embodiment of the invention. The method includes providing a set of operating parameters and a receiver transmitter feedback mechanism for governing the operating parameters. The operating parameters include transmission power (P), spectrum access probability (R) and spectrum occupation time (T). The receiver transmitter feedback mechanism is used to calculate the statistical value of a Receiver Success Rate (RSR). The RSR is a measure of the success rate of the receiver receiving a transmitted signal.

At step 202, the applicable regulatory limit values are obtained for the various operating parameters P, R and T. At Step 204, the operating parameters are assigned a default value based on the type of communications to be performed. At Step 206, information is obtained, either from local data such a re-transmission rate or directly from the receiver. At step 208, the RSR at the receiver's end is determined. Based on this RSR, the values of the operating parameters are adjusted at the transmitter's end at step 210. This process enables optimal utilization of the spectrum, without restricting the design or technology choices of wireless devices.

The value of RSR is used to drive transmission decisions. A higher value of RSR encourages transmissions, and vice versa. Transmission power is the power by means of which a transmission can be sent. In an embodiment of the invention, the transmission power is measured in terms of Power Spectral Density (PSD), which is the average power in, for example, milliwatt per megahertz (mW/MHz), measured at a transmitter antenna when the transmitter is on. Spectrum access probability is measured in terms of the Listen Before Talk threshold and a backoff time. The spectrum occupation time may be measured in terms of duty cycles or in absolute time units.

According to an exemplary embodiment of the invention, coordination of radio resource usage also includes modification of transmission power of wireless devices 104, 106, and 108 by the spectrum occupation time. The level of interference is determined by the output power of other transmitters in the vicinity of the receiver. The output power, in turn, is driven by the need to deliver a certain power level at the intended receiver. More transmission power means more accurate communication but more interference on other radio systems. The transmission power limit can include a duty cycle factor, which is the ratio between the on-air time and the separation between on-air events. Conceptually, the product of the duty cycle and transmission power is assigned a constant value. This implies that a shorter duty cycle allows a higher radio frequency power and vice versa. In other words, wireless devices that can operate at a lower transmission power output can be on-air for a longer time, and systems that are on-air for a shorter period of time can use a higher transmission power output. This limits the maximum time a wireless device can transmit or otherwise occupy the spectrum. It also discourages so called "channel hogging" without sending a message.

The spectrum access probability is determined in another exemplary embodiment of the invention. Relating the transmission power output and transmission duty cycles is important since it helps in optimizing the power output of the plurality of wireless devices 104, 106, and 108 accessing the spectrum. However, it is equally important to separate transmissions in time and minimize interference caused by a plurality of wireless devices 104, 106, and 108 operating in the same unlicensed frequency band. Therefore, the availability of the channel, for sending a transmission, is determined. This process is called "listen before talk" and helps in coordinating the timing of the transmissions. This is achieved by a LBT threshold and LBT backoff. The LBT threshold is an indication of maximum transmission energy as seen by the receiver associated with the transmitter. A higher value of the LBT threshold indicates a higher transmission probability. LBT backoff is the time period a transmission has to wait if the spectrum for communicating with another receiver is occupied.

In an embodiment of the invention, LBT back-off is used: if it is sensed that the spectrum to be used has energy above the threshold, the transmitter waits until the energy drops below the threshold and then waits a random period of time before trying again, for example, n*2 microsecond, wherein n=a random variable. This variable too can be made flexible. At low-duty cycles, a fixed LBT back-off can be considered sufficient, while at high-duty cycles, a longer a variable, recursive LBT back-off prevents high-duty cycle wireless devices from locking out low-duty cycle wireless devices.

Figure 3:
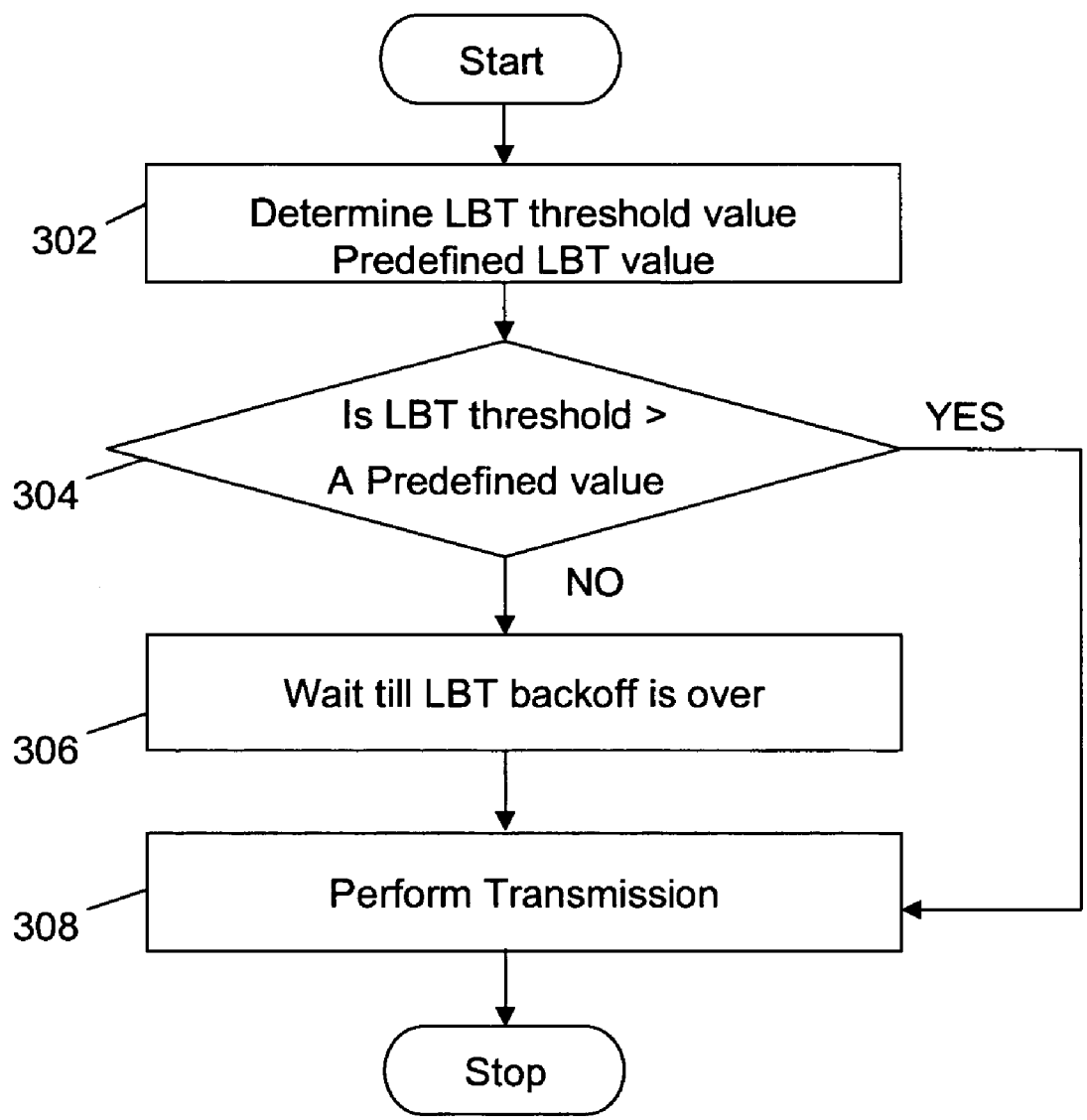
FIG. 3 shows a flowchart depicting a method for the calculation of spectrum access probability, in an exemplary embodiment of the invention.

FIG. 3 is a flowchart depicting a method for the calculation of spectrum access probability, in an exemplary embodiment of the invention. The method starts at step 302, wherein the LBT threshold value and the LBT backoff value is determined based on the RSR. At step 304, if the LBT threshold value is higher than the received signal strength, the transmission is performed. This predefined threshold value is derived from the nominal value and from the RSR obtained via receiver to transmitter feedback. The transmission has to wait for the spectrum to become free if the spectrum is occupied i.e. when the received signal is higher than the LBT threshold. This waiting time begins when the received signal drops below the LBT threshold and is determined by the LBT back-off at step 306. Typically, a longer back-off prevents or discourages systems with longer spectrum occupation time from locking out systems with low duty cycles. Finally, when the LBT backoff is over and the spectrum is free, transmission is performed at step 310. In some embodiments of the invention, the LBT back-off may be increased according to step 308. In some other embodiments of the invention, a short sequence of transmissions is lumped together and considered to be one LBT event. In an embodiment of the invention, such an LBT event can be limited in time to avoid placing an undue burden on other users. This ensures that the maximum time a station can transmit or occupy the spectrum is limited.

To summarize, the embodiments of the invention provide a set of basic rules to govern behaviour in multiple usage spectrum such as an unlicensed frequency band. In various embodiments of the invention, the rules can be applicable to three types of operating parameters, i.e., P, R and T. The operating values of these parameters are derived from nominal values, modified according to the type of communications performed by the transmitter and, in some cases, additionally, by the RSR obtained via receiver to transmitter feedback. Exemplary rules are hereinafter summarized.

Firstly, all devices observe a maximum spectrum occupation time, during which the ability of a station to transmit or otherwise occupy the spectrum is limited. Secondly, all devices observe a common Power Spectral Density (PSD) limit—modified by their 'on-air time'. As described earlier, less on-air time means more power. Thirdly, devices use Listen Before Talk to determine their spectrum access probability—modified by their PSD and receiver success rate. As mentioned earlier, a lower PSD output allows a higher LBT threshold (=less sensitive), and a greater probability of successful receive implies less sensitivity to other transmissions.

Figure 4:
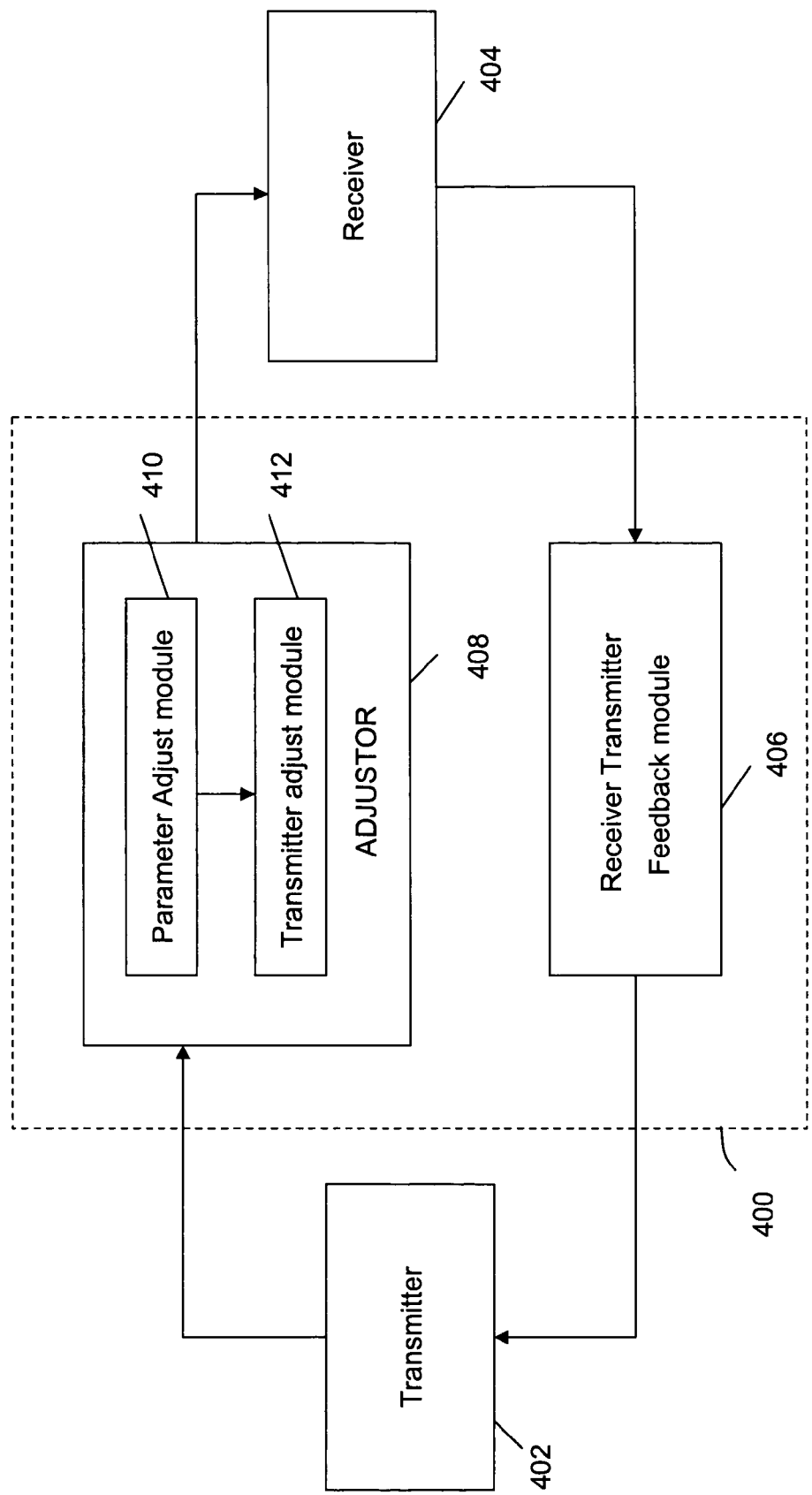
FIG. 4 illustrates a system coordinating radio resource usage by a plurality of wireless devices in an unlicensed frequency band, in an exemplary embodiment of the invention.

Another exemplary embodiment of the invention provides a system for coordinating radio resource usage by a plurality of wireless devices in an unlicensed frequency band. FIG. 4 illustrates a system 400 that incorporates the spectrum-sharing rules for establishing communication between wireless devices. In various embodiments of the invention, system 400 can be connected to a transmitter 402 and a receiver 406 of wireless device 104.

System 400 includes transmitter 402, adjustor 404 and receiver 406. Adjustor 404 further includes a parameter adjust module 410 and a transmitter adjust module 412. In various embodiments of the invention, the system elements of system 400 can be implemented as software, hardware, firmware, and their combination thereof. In an embodiment of the invention, parameter adjust module 410 receives feedback 408 from the remote receiver 406 and adjusts the operating parameters.

Transmitter 402 transmits the information to receiver 406. On receiving the transmitted information, receiver 406 may send a feedback to transmitter 402. Typically, receiver to transmitter feedback is used to determine a statistical parameter called the Receiver Success Rate (RSR). In an embodiment, parameter adjust module 410 predicts the RSR from local information like the absence of acknowledgements from receiver 406. The information is transmitted according to the adjusted value for the operating parameters by transmitter adjust module 412. The value of the RSR is used to modify the operating parameters by transmitter adjust module 412. The operating parameters so adjusted may include transmission power (P), spectrum access probability (R), and spectrum occupation time (T).

A dynamic RSR implementation can be verified by setting up a communication between two devices and injecting interference at the receiver; and the behavior of the transmitter can then be made to change in predictable ways.

Some exemplary techniques for RSR computation are hereinafter described. In an exemplary embodiment of the invention, the RSR is computed by using an in-band signaling technique, which keeps a constant tab on operating conditions. This technique may add a bit of overhead to each transmission.

In another embodiment of the invention, the RSR is computed, based on a simple acknowledgement technique, which involves maintaining acknowledgement statistics. This technique can be useful in cases where changes in the RF channel take place slowly, relative to channel occupancy. An exemplary case can be an indoor environment, which has sufficient reflectivity to 'smear out' RF fields so that the above condition is likely to occur.

In another embodiment of the invention, local interference statistics are broadcasted by the receiver to the transmitters. This can be done in cases where the communication between the wireless devices is intermittent. In an embodiment of the invention, the receivers can broadcast their typical or averaged interference levels so that transmitters have a basis for picking a reasonable RSR value for a given transmitter. An exemplary network wherein this technique can be applied is a Radio Local Area Network (RLAN), wherein the interference data can be sent out with each beacon.

To summarize, the various embodiments of the invention ensure that no device can monopolize the spectrum being used. Further, shorter duty cycles facilitate access to the RF spectrum and/or higher RF power, and better receivers mean advantageous channel access. Additionally, channel-hogging, to get a message or packet through, is discouraged.

In various embodiments of the invention, rules based on the operating parameters can be used in conjunction with schemes such as fast acknowledgement schemes, Wireless Multimedia Enhancements (WMEs) of IEEE 802.11, and Quality of Service (QoS) schemes. Further, the embodiments of the invention are applicable with bursting, high-gain antennas and Multiple Input Multiple Output (MIMO) schemes.

Any suitable programming language can be used to implement the routines of the present invention, including C, C++, Java, assembly language, etc. Different programming techniques can be employed, such as procedural or object-oriented techniques. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant are will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail, to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and different locations, by different (or the same) processing systems.

Reference throughout this specification to "one embodiment", "an embodiment", or "a specific embodiment" means that a particular feature, structure or characteristic described in connection with the embodiment is included in at least one embodiment of the present invention, and not necessarily in all embodiments. Therefore, the appearance of the phrases "in one embodiment", "in an embodiment", or "in a specific embodiment" in various places throughout this specification are not necessarily referring to the same embodiment. Furthermore, the particular features, structures or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

Embodiments of the invention may be implemented by using a programmed general-purpose digital computer, by using application-specific integrated circuits; programmable logic devices; field-programmable gate arrays; and optical, chemical, biological, quantum or nanoengineered systems, components and mechanisms. In general, the functions of the present invention can be achieved by any means, as is known in the art. Distributed or networked systems, components and circuits can also be used. The mode for the communication or transfer of data may be wired, wireless or any other means.

It will also be appreciated that one or more of the elements depicted in the drawings/figures can also be implemented in a more separated or integrated manner, or even removed or rendered as inoperable in certain cases, as is useful, in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Further, the term "or", as used herein, is generally intended to mean "and/or" unless otherwise indicated. Combinations of components or steps will also be considered as being noted, where terminology is foreseen as rendering unclear the ability to separate or combine.

As used in the description herein and throughout the claims that follow, "a", "an", and "the" include plural references unless the context clearly dictates otherwise. Also, as used in the description herein and throughout the claims that follow, the meaning of "in" includes "in" and "on", unless the context clearly dictates otherwise.

The foregoing description of the illustrated embodiments of the present invention, including what is described in the Abstract, is not intended to be exhaustive or to limit the invention to the precise forms disclosed herein. While specific embodiments and examples of the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention, and are to be included within the spirit and scope of the present invention.

Therefore, while the present invention has been described herein with reference to the particular embodiments thereof, latitude of modification, various changes and substitutions are intended in the foregoing disclosures. It will be appreciated that in some instances some features of embodiments of the invention will be employed without a corresponding use of other features, without departing from the scope and spirit of the invention, as set forth. Therefore, many modifications may be made to adapt a particular situation or material to the essential scope and spirit of the present invention. It is intended that the invention is not limited to the particular terms used in the claims that follow and/or to the particular embodiment disclosed as the best mode contemplated for carrying out this invention, but that it will include any and all embodiments and equivalents falling within the scope of the appended claims.

What is claimed is:

1. A method for coordinating radio resource usage by a plurality of wireless devices in an unlicensed frequency band, the method comprising:
    providing a set of operating parameters, the operating parameters comprising a transmission power (P), a spectrum occupation time (T), and a spectrum access probability (R) for restricting the access of the spectrum by the plurality of radio frequency devices, the set of operating parameters including values assigned to the operating parameters and used to determine transmission decisions to access the unlicensed frequency band for a transmitter;
    providing a receiver transmitter feedback mechanism for governing the operating parameters;
    determining feedback information from a receiver receiving a transmission from the transmitter; and
    calculating a feedback value based on the feedback information, the feedback value used to alter values for the set of operating parameters, wherein the altered values for the set of operating parameters are used to determine transmission decisions for the transmitter to access the unlicensed frequency band based on the transmission power (P), the spectrum occupation time (T), and the spectrum access probability (R).

2. The method of claim 1, wherein the feedback value comprises a receiver success rate (RSR), the RSR being the measure of statistical value of success for receiving a transmitted signal by the receiver.

3. The method of claim 1, further comprising assigning a default value to a multiplicative product of the operating parameters.

4. The method of claim 3, further comprising adjusting a default multiplicative product value of operating parameters according to the calculated RSR value.

5. The method of claim 1, wherein the transmission power is measured in terms of a power spectral density, the power spectral density being the average power output measured at a suitable reference point when the transmitter is on.

6. The method of claim 1, wherein the spectrum occupation time is measured in terms of a duty cycle, the duty cycle being the ratio between on-air time and the separation between on-air events.

7. The method of claim 1, wherein the spectrum access probability further comprises
    a listen before talk threshold, the listen before talk threshold being the measure of the maximum received energy that allows for a transmission to take place; and
    a listen before talk backoff, the listen before talk backoff being the time for which a transmitter has to wait when the spectrum is no longer occupied.

8. The method of claim 1, wherein the operating parameters can be set by an entity that has licensing rights to the radio spectrum.

9. A system for coordinating radio resource usage by a plurality of wireless devices in an unlicensed frequency band, the system comprising
    a transmitter for transmitting information;
    a receiver for receiving the transmitted information and providing a receiver transmitter feedback; and
    an adjustor for adjusting a set of operating parameters for the information to be transmitted based on the receiver transmitter feedback, the set of operating parameters comprising a transmission power (P), a spectrum occupation time (T), and a spectrum access probability (R) for restricting the access of the spectrum by the plurality of radio frequency devices, the set of operating parameters including values assigned to the operating parameters and used to determine transmission decisions to access the unlicensed frequency band for a transmitter, the adjustor configured to:

determine feedback information from a receiver receiving a transmission from the transmitter;

calculate a feedback value based on the feedback information, the feedback value used to alter values for the set of operating parameters, wherein the altered values for the set of operating parameters are used to determine transmission decisions for the transmitter to access the unlicensed frequency band based on the transmission power (P), the spectrum occupation time (T), and the spectrum access probability (R).

10. The system of claim 9, wherein the adjustor further comprising a parameter adjust module for adjusting the operating parameters based on the receiver transmitter feedback; and a transmitter adjust module for transmitting the information according to the adjusted parameters.

11. The system of claim 9, wherein the feedback value comprises a receiver success rate (RSR), the RSR being the measure of statistical value of success for receiving a transmitted signal by the receiver.

12. The system of claim 9, wherein the parameter adjust module adjusts a default multiplicative product value of operating parameters according to the calculated RSR value.

13. The system of claim 9, wherein the operating parameters can be set by an entity that has licensing rights to the radio spectrum.

14. The system of claim 9, wherein the adjustor adjusts the transmission power in terms of a power spectral density, the power spectral density being the average power output measured at a suitable reference point when the transmitter is on.

15. The system of claim 9, wherein the adjustor adjusts the spectrum occupation time in terms of a duty cycle, the duty cycle being the ratio between on-air time and the separation between on-air events.

16. The system of claim 9, wherein the adjustor adjusts the spectrum access probability based on a listen before talk (LBT) threshold and a listen before talk (LBT) backoff, the LBT threshold being the measure of the maximum received energy that allows for a transmission to take place, and the LBT backoff being the time for which the transmitter has to wait when the spectrum is no longer occupied.

17. A method for coordinating radio resource usage by a plurality of wireless devices in an unlicensed frequency band, the method comprising:

determining operating values for a set of operating parameters comprising a transmission power (P), a spectrum occupation time (T), and a spectrum access probability (R) for restricting the access of the spectrum by the plurality of radio frequency devices, the operating parameters used to determine transmission decisions for a transmitter in the unlicensed frequency band, the unlicensed frequency band being shared by a plurality of transmitters and receivers;

determining feedback information from a receiver receiving a transmission from the transmitter, the feedback information indicating a success rate of receiving a transmitted signal from the transmitter; and determining adjusted operating values for the set of operating parameters, wherein the altered values for the set of operating parameters are used to determine transmission decisions to access the unlicensed frequency band such that access for the transmitter is adjusted as compared to access by the plurality of transmitters sharing the unlicensed frequency band based on the transmission power (P), the spectrum occupation time (T), and the spectrum access probability (R).

18. The method of claim 17, further comprising:

determining a transmission method based on the operating values for P, T, or R; and transmitting the data according to the transmission method based on the feedback information and operating values.

19. The method of claim 17, wherein the parameters are adjusted for the transmitter such that access as compared to access by the plurality of transmitters for the transmitter is improved for the unlicensed frequency band.

20. An apparatus comprising:

one or more processors; and one or more computer-readable media encoded with logic for execution by the one or more processors, the logic, when executed, operable to:

provide a set of operating parameters, the operating parameters comprising a transmission power (P), a spectrum occupation time (T), and a spectrum access probability (R) for restricting the access of the spectrum by the plurality of radio frequency devices, the set of operating parameters including values assigned to the operating parameters and used to determine transmission decisions to access the unlicensed frequency band for a transmitter;

provide a receiver transmitter feedback mechanism for governing the operating parameters;

determine feedback information from a receiver receiving a transmission from the transmitter; and calculate a feedback value based on the feedback information, the feedback value used to alter values for the set of operating parameters, wherein the altered values for the set of operating parameters are used to determine transmission decisions for the transmitter to access the unlicensed frequency band based on the transmission power (P), the spectrum occupation time (T), and the spectrum access probability (R).

* * * * *